US008294583B2

(12) United States Patent
Sayegh et al.

(10) Patent No.: US 8,294,583 B2
(45) Date of Patent: Oct. 23, 2012

(54) THEFT DETERRENT TAG

(75) Inventors: Adel O. Sayegh, Rancho Cucamonga, CA (US); Edgardo Redublo, Chino Hills, CA (US)

(73) Assignee: Universal Surveillance Corporation, Rancho Cucamonga, CA (US)

(*) Notice: Subject to any disclaimer, the term of this patent is extended or adjusted under 35 U.S.C. 154(b) by 421 days.

(21) Appl. No.: 12/714,338

(22) Filed: Feb. 26, 2010

(65) Prior Publication Data

US 2010/0242552 A1 Sep. 30, 2010

Related U.S. Application Data

(60) Provisional application No. 61/156,475, filed on Feb. 27, 2009.

(51) Int. Cl.

| | |
|---|---|
| ***G08B 13/14*** | (2006.01) |
| ***B65D 63/00*** | (2006.01) |
| ***B65D 67/02*** | (2006.01) |
| ***B65D 55/14*** | (2006.01) |
| ***F16L 33/00*** | (2006.01) |
| ***F16L 3/22*** | (2006.01) |
| ***F16L 3/08*** | (2006.01) |
| ***F16L 3/12*** | (2006.01) |
| ***E05B 73/00*** | (2006.01) |
| ***E05B 75/00*** | (2006.01) |
| ***E05B 65/00*** | (2006.01) |
| ***E05B 65/48*** | (2006.01) |
| ***E05B 65/52*** | (2006.01) |

(52) U.S. Cl. ............... 340/572.9; 340/572.1; 340/572.2; 340/572.8; 24/16 PB; 24/17 AP; 70/14; 70/16; 70/18; 70/19; 70/57.1; 70/63; 248/68.1; 248/74.1; 248/74.3

(58) Field of Classification Search ............... 340/572.1, 340/572.2, 572.8, 572.9; 24/16 PB, 17 AP; 70/14, 16, 18, 19, 57.1, 63; 248/68.1, 74.1, 248/74.3
See application file for complete search history.

(56) References Cited

U.S. PATENT DOCUMENTS

| | | | | |
|---|---|---|---|---|
| 1,796,341 | A * | 3/1931 | Otten | 63/3 |
| 2,119,436 | A * | 5/1938 | Lauff | 63/4 |
| 2,595,264 | A * | 5/1952 | Jespersen | 24/176 |
| 3,293,846 | A * | 12/1966 | Pauli | 368/10 |
| 3,748,672 | A * | 7/1973 | Patrick et al. | 441/131 |
| 4,380,097 | A * | 4/1983 | Keifer | 70/57.1 |
| 4,825,156 | A * | 4/1989 | Read | 324/166 |
| 5,099,662 | A * | 3/1992 | Tsai | 70/16 |
| 5,291,761 | A * | 3/1994 | Lii | 70/18 |
| 5,904,442 | A * | 5/1999 | Takeda | 403/392 |
| 7,259,674 | B2 * | 8/2007 | Marsilio et al. | 340/572.1 |
| 7,394,376 | B1 * | 7/2008 | Sayegh et al. | 340/572.1 |
| 7,404,484 | B2 * | 7/2008 | Farrar et al. | 206/308.1 |
| D596,520 | S * | 7/2009 | Sayegh et al. | D10/106.92 |
| 7,595,733 | B2 * | 9/2009 | Spagna | 340/572.8 |
| 7,650,768 | B2 * | 1/2010 | Fawcett et al. | 70/58 |
| 7,878,033 | B2 * | 2/2011 | Fawcett et al. | 70/58 |
| 8,044,806 | B2 * | 10/2011 | Sayegh | 340/572.9 |
| 2005/0268672 | A1 * | 12/2005 | Fraser et al. | 70/57.1 |

(Continued)

*Primary Examiner* — Daniel Wu
*Assistant Examiner* — Kam Ma
(74) *Attorney, Agent, or Firm* — Milord A. Keshishian

(57) ABSTRACT

An EAS Tag with a marker that includes an adjustable housing comprised of a plurality of portions movably coupled with one another, forming an adjustable enclosure. A portion of the plurality of portions is movably coupled with a next, subsequent adjacent portion of the plurality of portions, with a first section of a first portion detachably, and adjustably accommodating a final portion to form the adjustable enclosure.

14 Claims, 14 Drawing Sheets

U.S. PATENT DOCUMENTS

| | | | | |
|---|---|---|---|---|
| 2006/0170559 | A1* | 8/2006 | Marsilio et al. | 340/572.9 |
| 2007/0152836 | A1* | 7/2007 | Nagelski et al. | 340/572.9 |
| 2007/0163309 | A1* | 7/2007 | Fawcett et al. | 70/57.1 |
| 2007/0247313 | A1* | 10/2007 | Marsilio et al. | 340/572.1 |
| 2008/0030334 | A1* | 2/2008 | Marsilio et al. | 340/572.1 |
| 2008/0284601 | A1* | 11/2008 | Sayegh et al. | 340/572.1 |
| 2008/0289372 | A1* | 11/2008 | Rendon et al. | 70/57.1 |
| 2010/0005840 | A1* | 1/2010 | Hogan et al. | 70/63 |
| 2010/0060460 | A1* | 3/2010 | Zinner | 340/572.9 |
| 2010/0242552 | A1* | 9/2010 | Sayegh et al. | 70/58 |
| 2010/0287998 | A1* | 11/2010 | Anderson et al. | 70/57.1 |
| 2011/0140894 | A1* | 6/2011 | Sayegh et al. | 340/572.8 |
| 2012/0031153 | A1* | 2/2012 | Conti | 70/14 |
| 2012/0073336 | A1* | 3/2012 | Thoonsen | 70/19 |

* cited by examiner

THEFT DETERRENT TAG

CROSS-REFERENCE TO RELATED APPLICATIONS

This Application claims the benefit of priority of U.S. Utility Provisional Patent Application No. 61/156,475, filed Feb. 27, 2009, the entire disclosure of which is expressly incorporated by reference herein.

BACKGROUND OF THE INVENTION

1. Field of the Invention

This invention relates to theft deterrent security tags in general, and in particular to security tags that are coupled with items that cannot be penetrated by a pin or other penetrable devices for monitoring, non-limiting example of such items may include bottles, golf clubs, baseball bats, tennis rackets and so on.

2. Description of Related Art

Conventional electronic article surveillance (EAS) systems are known and have been used for a number of years. Most have the common feature of employing a marker or tag that is affixed to an article to be protected against theft from a controlled area, such as merchandise in a store. When a legitimate purchase of the article is made, the marker can either be removed from the article, or converted from an activated state to a deactivated state. Such systems employ a detection arrangement, commonly placed at all exits of a store, and if an activated marker passes through the detection system, it is detected by the detection system and an alarm is triggered.

There remains a long standing and continuing need for an advance in the art of EAS and theft deterrent tags that makes the tags more compatible for use with impenetrable objects, more difficult to defeat, simpler in both design and use, more economical and efficient in their construction and use, and provide a more secure and reliable engagement of the article to be monitored.

BRIEF SUMMARY OF THE INVENTION

The present invention provides a theft deterrent tag, comprising:

an adjustable housing comprised of a plurality of portions movably coupled with one another, forming an adjustable enclosure; and a marker.

An exemplary optional aspect of the present invention provides a theft deterrent tag, wherein:

a portion of the plurality of portions is movably coupled with a next, subsequent adjacent portion of the plurality of portions, with a first section of a first portion detachably, and adjustably accommodating a final portion to form the adjustable enclosure.

A further exemplary optional aspect of the present invention provides a theft deterrent tag, wherein:

the final portion is comprised of:

a free leading end, with the final portion having a first surface that includes an engaging element; and a reinforcement piece that is inserted along a length of the final portion.

Still a further exemplary optional aspect of the present invention provides a theft deterrent tag, wherein:

the engaging element is comprised of a plurality of beveled teeth aligned along a length of the final portion, and positioned on the first surface.

Another exemplary optional aspect of the present invention provides a theft deterrent tag, wherein:

the engaging element includes openings into which a locking probe may be received.

Yet another exemplary optional aspect of the present invention provides a theft deterrent tag, that includes:

a release tab is projected from the first surface of the final portion, oriented transverse a longitudinal axis of the final portion;

A further exemplary optional aspect of the present invention provides a theft deterrent tag, wherein:

the final portion has a second surface that includes a set of protuberances at a near distal end.

Another exemplary optional aspect of the present invention provides a theft deterrent tag, wherein:

the first portion includes an opening defined through the first section that receives a free leading end of the final portion, and further includes a second chamber that can variably accommodate and lock a desired length of the final portion;

the first portion further includes a first chamber that accommodates a lock mechanism that locks in the desired length of the final portion within the second chamber.

Still another exemplary optional aspect of the present invention provides a theft deterrent tag, wherein:

a flange extends from the first section of the first portion forming a lip that facilitates coupling of the final portion with the first portion.

A further exemplary optional aspect of the present invention provides a theft deterrent tag, wherein:

the lock mechanism includes:

a resilient member that forces an interlock element towards the final portion inserted within the second chamber to lock a desired length of the final portion within the second chamber.

Still a further exemplary optional aspect of the present invention provides a theft deterrent tag, wherein:

the resilient member includes a biasing mechanism and an intermediary element that forces the interlock element towards the a section of the final portion in the second chamber.

Another exemplary optional aspect of the present invention provides a theft deterrent tag, wherein:

the interlock element is an arm with an engaging tip that is pushed into the path by the intermediary element, whereby the engaging tip attaches to engaging element, such that insertion into first portion is allowed, but extraction is not.

Yet another exemplary optional aspect of the present invention provides a theft deterrent tag, wherein:

a two step disengagement arrangement, wherein:

the interlock element remains interlocked and engaged with the final portion when the force exerted by the resilient member is removed; and the interlock element is released and disengages from the final portion when the force exerted by the resilient member is reversed and the final portion is further pushed into the second chamber to release and disengage the interlock member while the reversed force pulls the interlock member away from the final portion.

A further exemplary optional aspect of the present invention provides a theft deterrent tag, wherein:

a portion of the adjustable housing accommodates a detachable marker in a form of a signal disrupter.

Still a further exemplary optional aspect of the present invention provides a theft deterrent tag, wherein:

a portion of the adjustable housing is a fastener.

Another exemplary optional aspect of the present invention provides a theft deterrent tag, wherein:

a portion of the adjustable housing accommodates a series of apertures for coupling a locking cap that blocks and prevents a cap of a container from being opened.

Yet another exemplary optional aspect of the present invention provides a theft deterrent tag, wherein:

the plurality of portions have an arced configuration.

A further exemplary optional aspect of the present invention provides a theft deterrent tag, further including:

a friction pad coupled with the adjustable housing for preventing a movement of the theft deterrent tag in relation to an associated article.

Still a further exemplary optional aspect of the present invention provides a theft deterrent tag, wherein:

the friction pad is comprised of a plurality of friction pads individually coupled with the adjustable housing.

Such stated advantages of the invention are only examples and should not be construed as limiting the present invention. These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character (s) present corresponding part(s) throughout.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized. References to bottles or other somewhat cylindrically configured articles are meant to be illustrative and for convenience of example only, and should not be limiting.

The present invention provides an Electronic Article Surveillance (EAS) tag that overcomes the disadvantages of the conventional tags, including providing an EAS theft deterrent tag that is cost-efficient, durable, compact, is detachable when used with an authorized detaching unit, and can be attached to an item to be monitored without penetrating the item. In addition, the EAS device of the present invention can be quickly and easily secured to an article made of varying materials to prevent the unauthorized removal of the article, is a rugged theft deterrent unit to permit the repeated use thereof, and provides a two step disengagement feature that prevents unlocking the unit with exertion of force. Further, and in keeping with the principles of the present invention, a unique EAS theft deterrent tag is disclosed wherein the tag is capable of engaging articles that are to be monitored without necessitating the puncture of the articles with a pin. In addition, by providing an adjustable attachment mechanism, labor time and costs are reduced when attaching or removing the tag from an article being protected thereby.

Figure 1B:
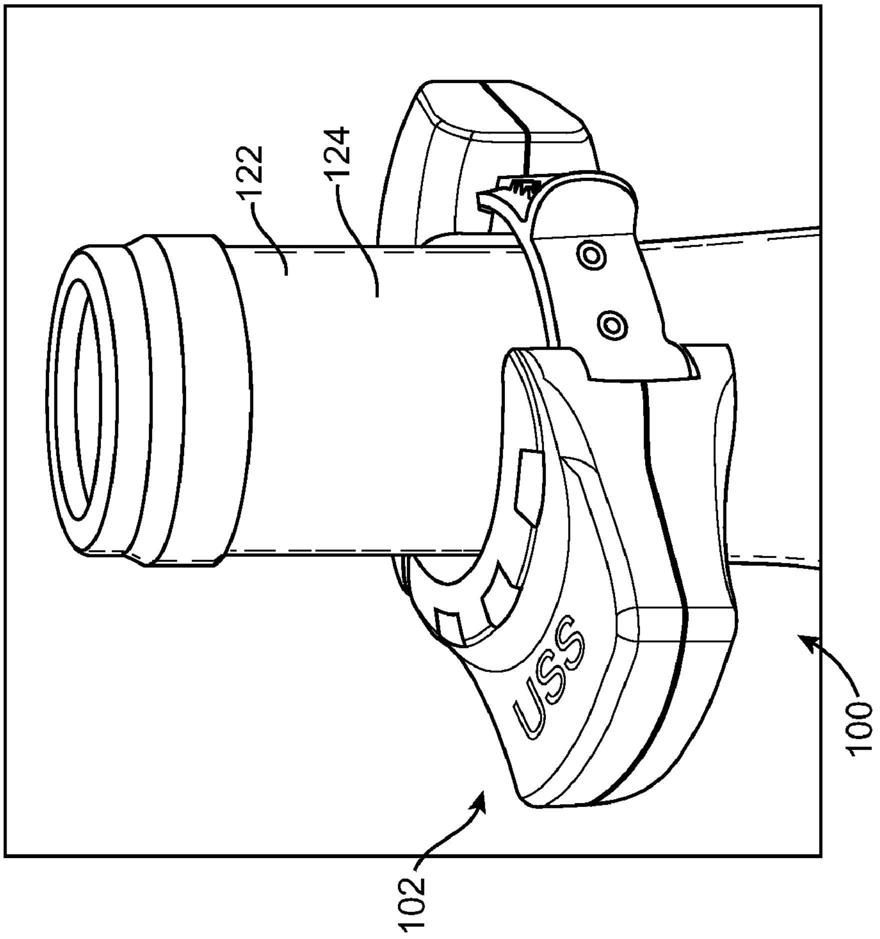
FIGS. 1A and 1B are exemplary illustrations of an EAS tag coupled with an article in use in accordance with the present invention.
Figure 1A:
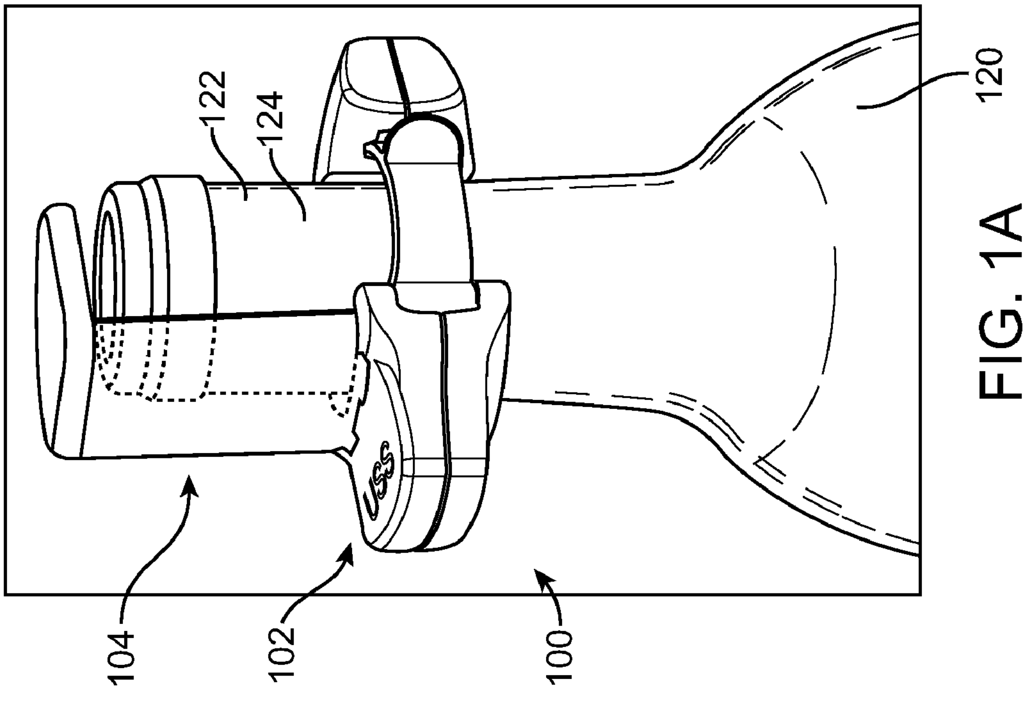

FIGS. 1A and 1B are exemplary illustrations of an EAS tag in use in accordance with the present invention. Referring to FIGS. 1A and 1B, an EAS tag 100 is exemplarily illustrated that is configured to engage objects without penetrating the object by a pin or other penetrable means. As a non-limiting example only, the EAS tag 100 is illustrated in FIGS. 1A and 1B as engaged with a neck 122 of a bottle 120, with a cork 124 used as the closure or cap of the bottle 120. The EAS tag 100 of the present invention may be used with any object that cannot and should not be penetrated or punctured by an EAS tag, non-limiting examples of which may include a shaft of a golf club, a baseball bat, a tennis request, a fishing pole, or others such as perfume bottles.

As further illustrated in FIGS. 1A and 1B, the EAS tag 100 of the present invention provides an attachment unit 102 that compactly encloses around an article 120. Accordingly, when coupled with articles, no section of the EAS tag 100 extends out of the EAS tag (such as the conventional tags with extended straps) to interfere with other tags. This compact feature of the EAS tag 100 makes its use safe and convenient when the fragile articles and the attached EAS tags 100 are stored on a storage display with limited storage space (such as a display shelf for bottles of wine). Therefore, with the EAS tag 100 of the present invention, there is no extended section that can get in the way to knock off fragile articles as the articles are removed or displayed on the shelf. Accordingly, the use of EAS tags 100 of the present invention will not require a large shelf space for products to be safely displayed and removed, enabling a more efficient display of even more products on the same shelf space.

As further illustrated in FIGS. 1A and 1B, the tag 100 of the present invention further includes an optional blocking unit 104 that prevents and blocks a cap or a cork 124 of a container from being removed or opened without authorization. Therefore, the present invention also provides a provision in the form of the blocking unit 104 for preventing the consumption or use of the content of a container by blocking the container cap or closure 124 from being removed and the content of the container consumed.

Figure 2:
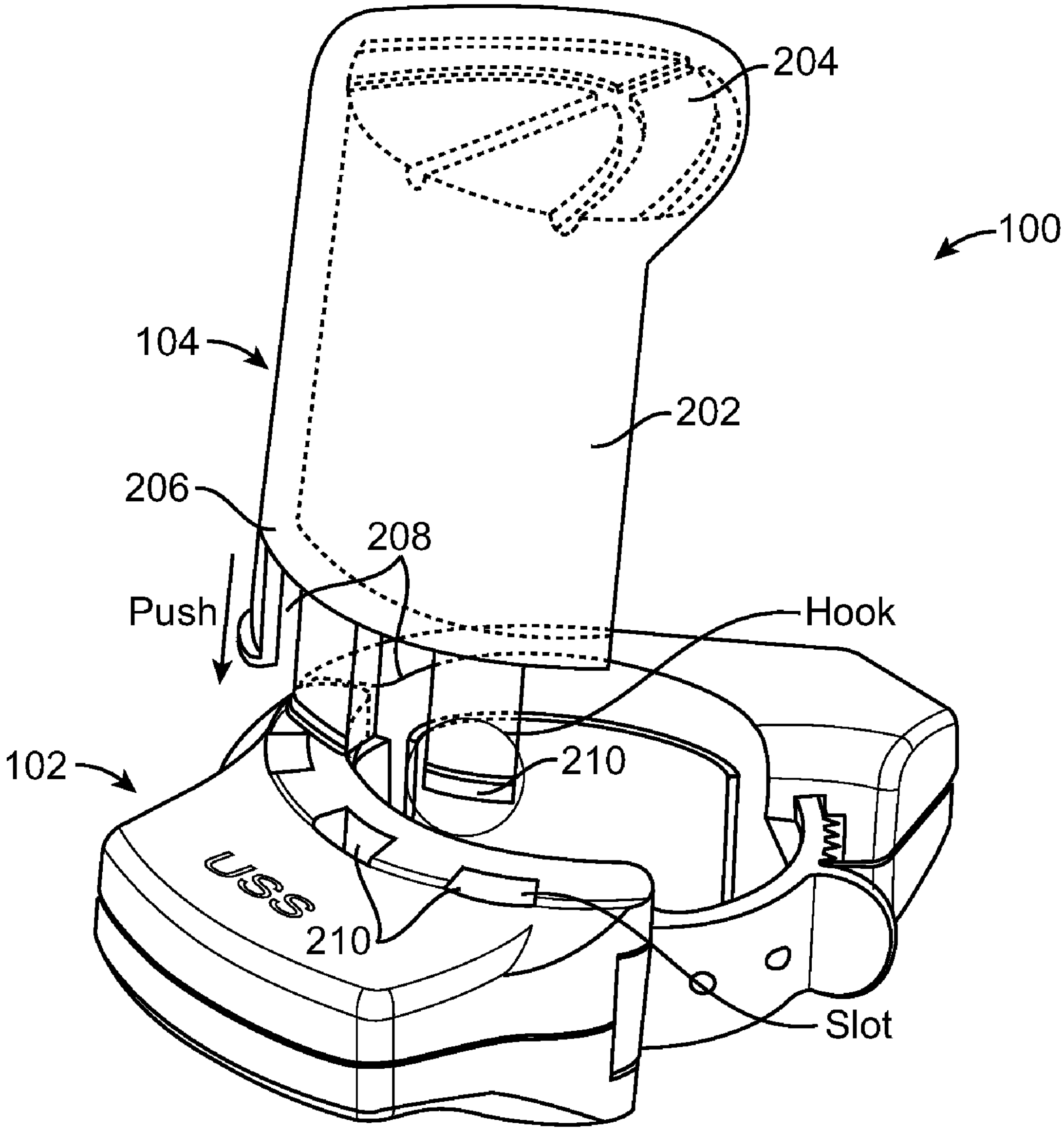
FIG. 2 is an exemplary illustration of an EAS Tag, with an attachment unit disengaged from a blocking unit in accordance with the present invention.

FIG. 2 is an exemplary illustration of the EAS Tag 100 of the present invention, with the attachment unit 102 disengaged from the blocking unit 104. As illustrated, the blocking unit 104 is comprised of a first section 202 that extends parallel the length of an article, passing the top end thereof. The first section 202 includes a first distal end 206 that includes a plurality of extensions 208 with lateral projections 216 that are permanently inserted (pushed) within a set of slots 210 on the attachment unit 102, permanently attaching the blocking unit 204 to the attachment unit 102. The blocking unit 104 further includes a second section 204 that is substantially perpendicular to the second distal end of the first section 202, and has a span that covers a substantial area of a container closure, blocking users from reaching or preventing the opening or removal of the closure or cap.

Figure 3A:
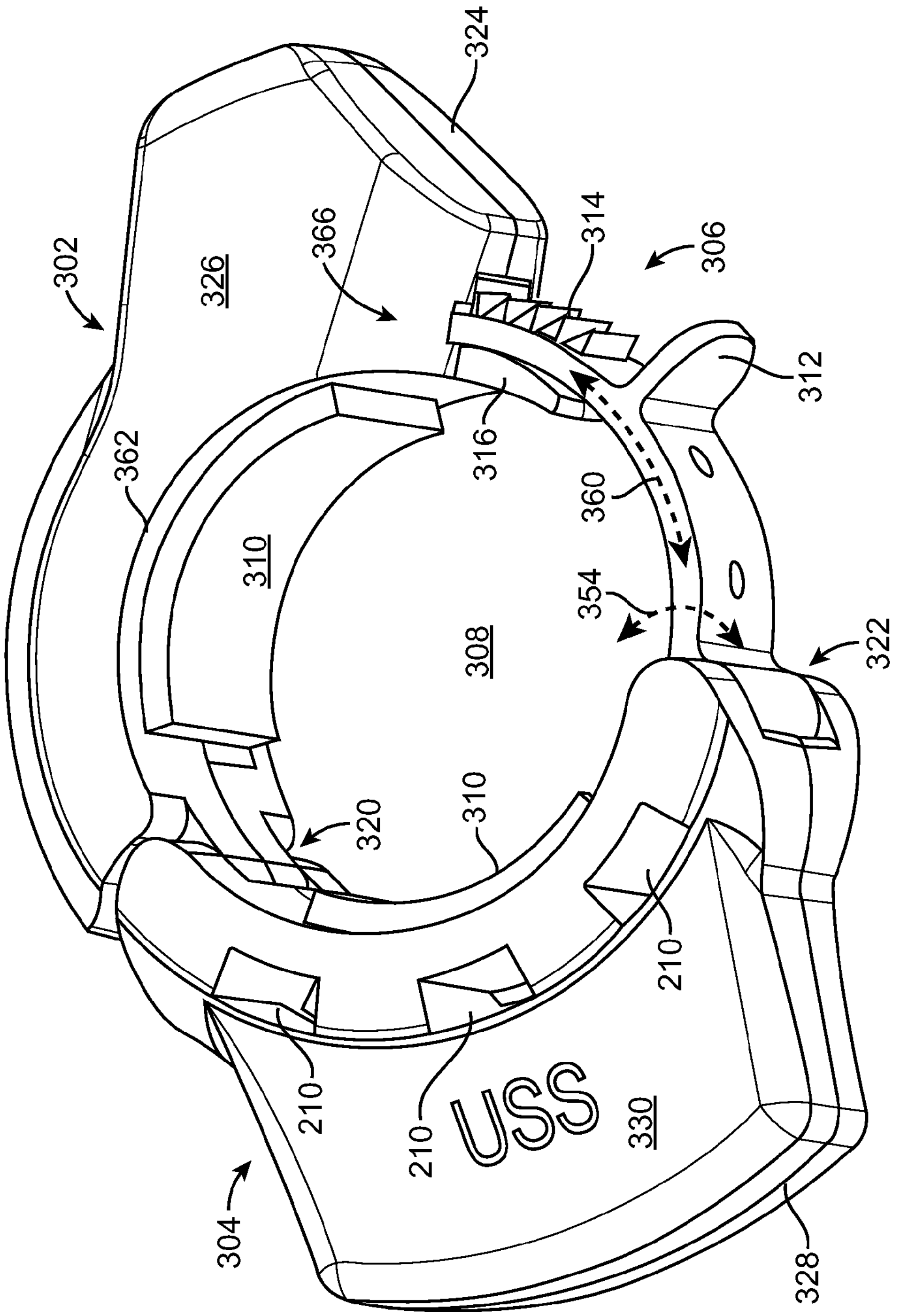
FIG. 3A is an exemplary illustration of the top perspective view of a locked EAS tag illustrated in FIGS. 1A to 2 in accordance with the present invention.
Figure 3B:
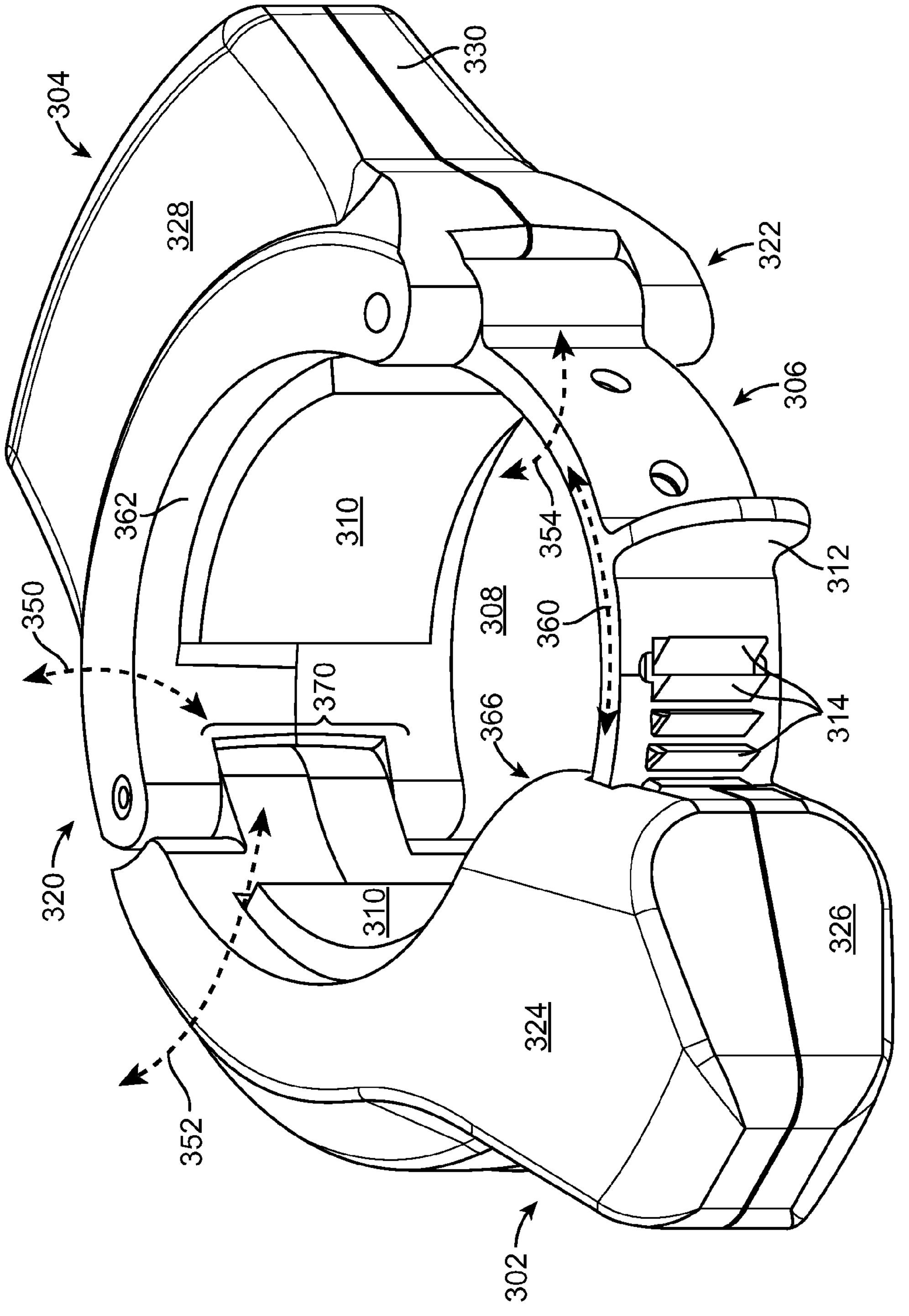
FIG. 3B is the bottom perspective view of the same illustrated in FIG. 3A.
Figure 3C:
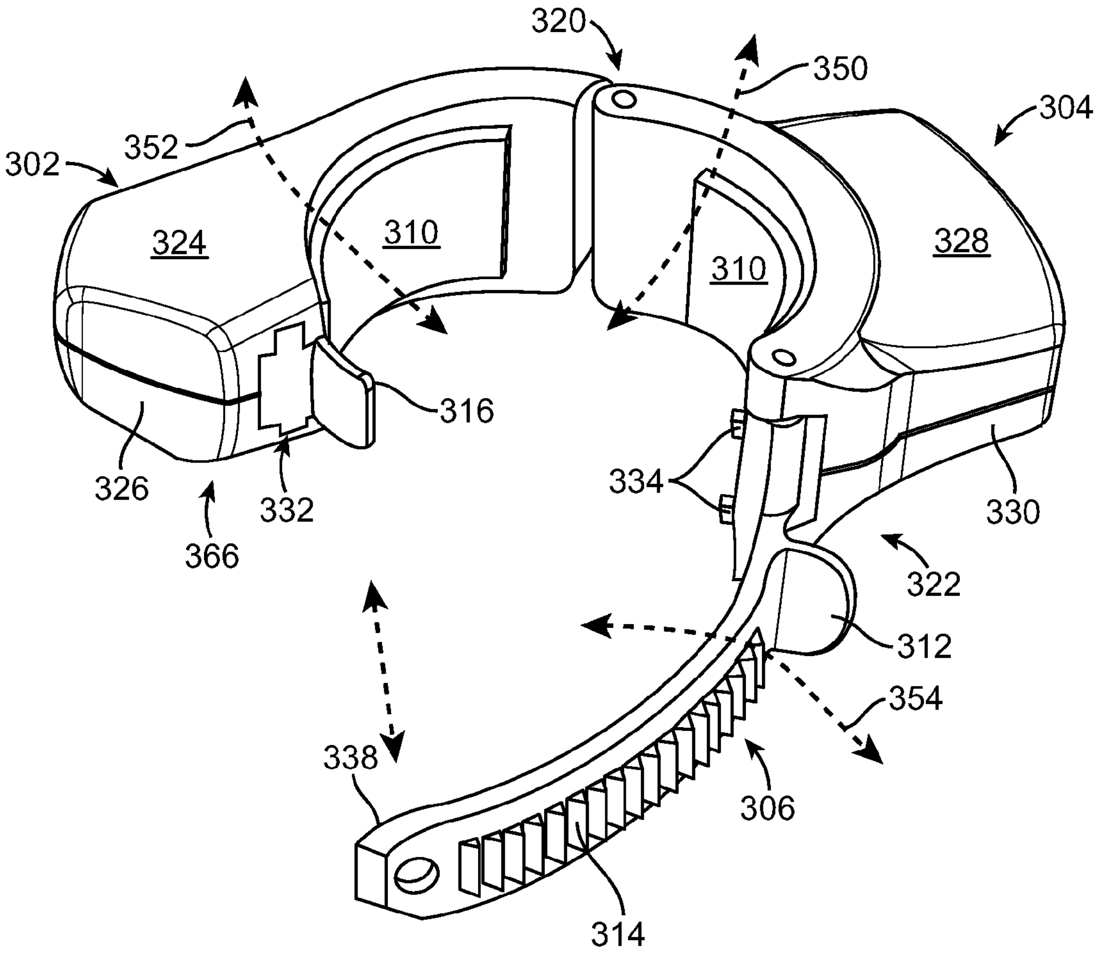
FIG. 3C is an exemplary illustration of a bottom perspective view of an open EAS tag shown in FIG. 3B, but with the final portion disengaged and in an open position.
Figure 3D:
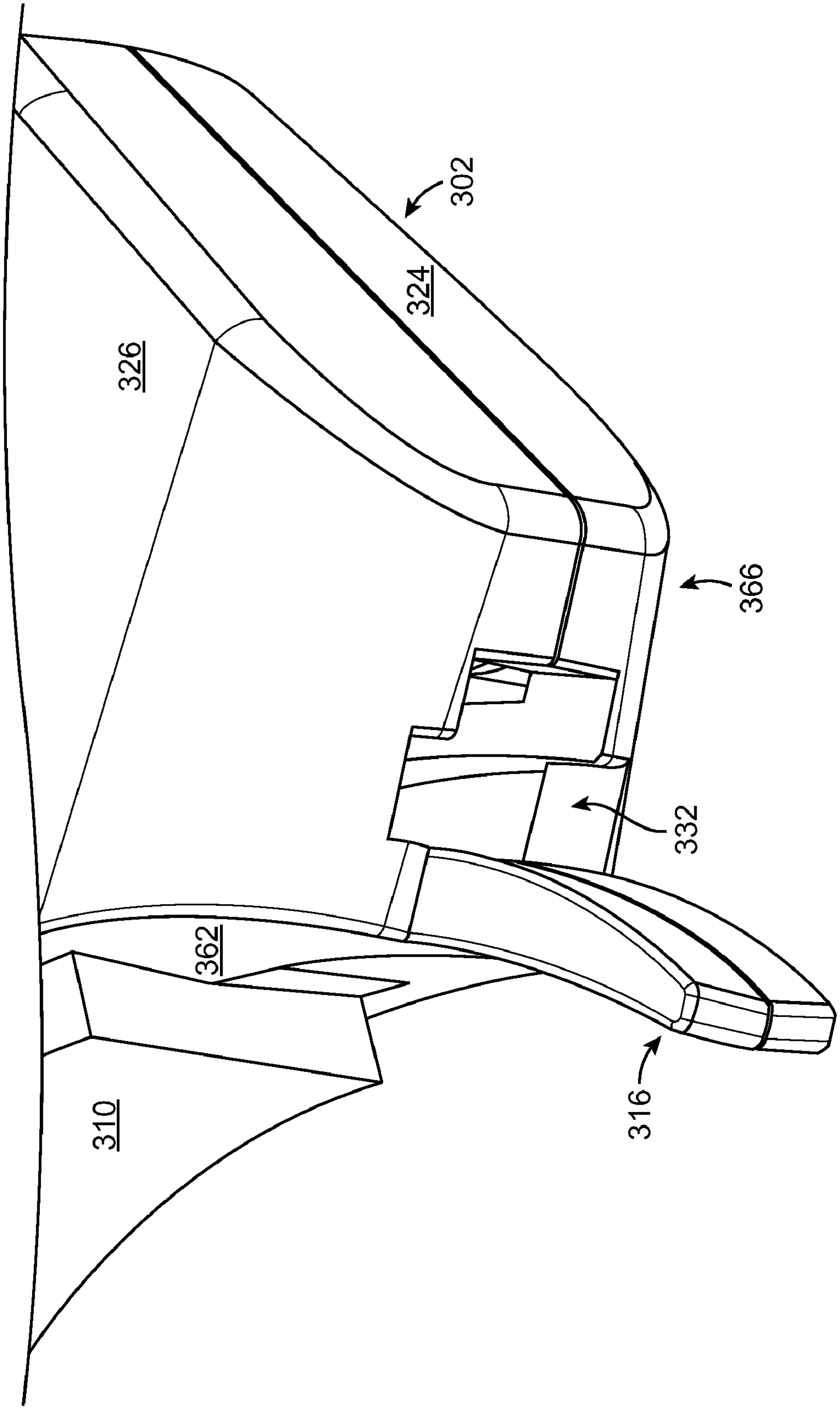
FIG. 3D is an exemplary illustration of a perspective close-up view of the first portion of the EAS tag shown in FIGS. 1A to 3C.

FIGS. 3A to 3D are exemplary illustrations of different views of the attachment unit of the of the EAS tag 100 in accordance with the present invention. In particular, FIG. 3A is an exemplary illustration of the top view of the locked or closed EAS tag 100, and FIG. 3B is the flipped bottom view of the locked or closed EAS tag 100 illustrated in FIG. 3A. FIG. 3C is an exemplary bottom view of the open EAS tag 100 shown in FIG. 3B, but with the final portion disengaged and in an open position, and FIG. 3D is an exemplary perspective close-up view of the engagement section of the first portion that engages or receives the final portion.

As illustrated in FIGS. 3A to 3D, the attachment unit 102 (hereinafter simply referred to as "EAS tag 100" for conniv-ance) includes an adjustable housing comprised of a plurality of portions movably coupled with one another, forming an adjustable enclosure that tightly engages an article. That is, a portion of the plurality of portions of the EAS tag 100 is movably coupled with a next, subsequent adjacent portion of the plurality of portions, with a first section of a first portion detachably, and adjustably accommodating a final portion to form the adjustable enclosure. It should be noted that although the plurality of portions are exemplarily illustrated as arced, the plurality of portions may be configured as straight or flat. For example, a plurality of straight or flat (instead of the illustrated arced) portions may be movably coupled with one another, forming an adjustable enclosure that tightly engages an article. Accordingly, as a non-limiting specific example, six straight portions forming a hexagon may be used instead of the three arced portions shown.

As further illustrated in FIGS. 3A to 3D, in one non-limiting preferred embodiment EAS tag 100 has a first portion 302, a second portion 304, and a third portion 306. The respective first and the second portions 302 and 306 are preferably made of a hard or rigid material. A usable rigid or hard material might be a hard plastic, non-limiting example of which may include an injection molded Acrylonitrile Butadiene Styrene (ABS) plastic. Third portion 306 is made of a flexible, yet durable and strong material, for example plastic or hardened rubber.

The respective first and second portions 302 and 304 of the EAS tag 100 include a friction pad 310 for preventing a movement of the EAS tag 100 in relation to an associated article. In one non-limiting preferred embodiment, the friction pad 310 is comprised of a plurality of friction pads 310 individually coupled with the lateral inside (or contact) facing surfaces 362 of the plurality of portions of the EAS tag 100 that touch and attach with the article. Accordingly, when tightly strapped around a smooth surface such as a neck of a glass bottle or a smooth grip surface of a baseball bat to secure the article, the soft, cushiony friction pads 310 of the EAS tag 100 prevent the EAS tag 100 from sliding on that smooth surface, which will prevent potential damage to wrapping or foil around the neck of the article (such as a printed foil wrapping around the neck of a bottle of wine or a paper logo glued to the grip portion of a baseball bat). More importantly, the friction pads 310 tightly grip the smooth surface of the article, preventing the EAS tag 100 from being forcibly and intentionally pushed towards a wider portion of the article to loosen the grip of the EAS tag 100 on the article, thereby defeating the EAS tag 100.

As further illustrated in FIGS. 3A to 3D, the respective first and the second portions 302 and 304 are comprised of two pieces, with the first portion 302 comprised of a first top piece 326 connected to a first bottom piece 324, and the second portion 304 comprised of a second top piece 330 connected to a second bottom piece 328. The respective first and the second portions 302 and 304 are moveably connected to one another, and in a non-limiting preferred embodiment are attached by a first hinge mechanism 320 that allows rotation of the respective portions 302 and 304 along the indicated reciprocating paths 350 and 352. In addition, the third portion 306 and second portion 304 are also moveably attached to one another, and in one non-limiting preferred embodiment, the respective third and the second portions 306 and 304 are moveably connected to one another by a second hinge mechanism 322 that allows rotation of both along the indicated reciprocating paths 350 and 354.

Figure 7A:
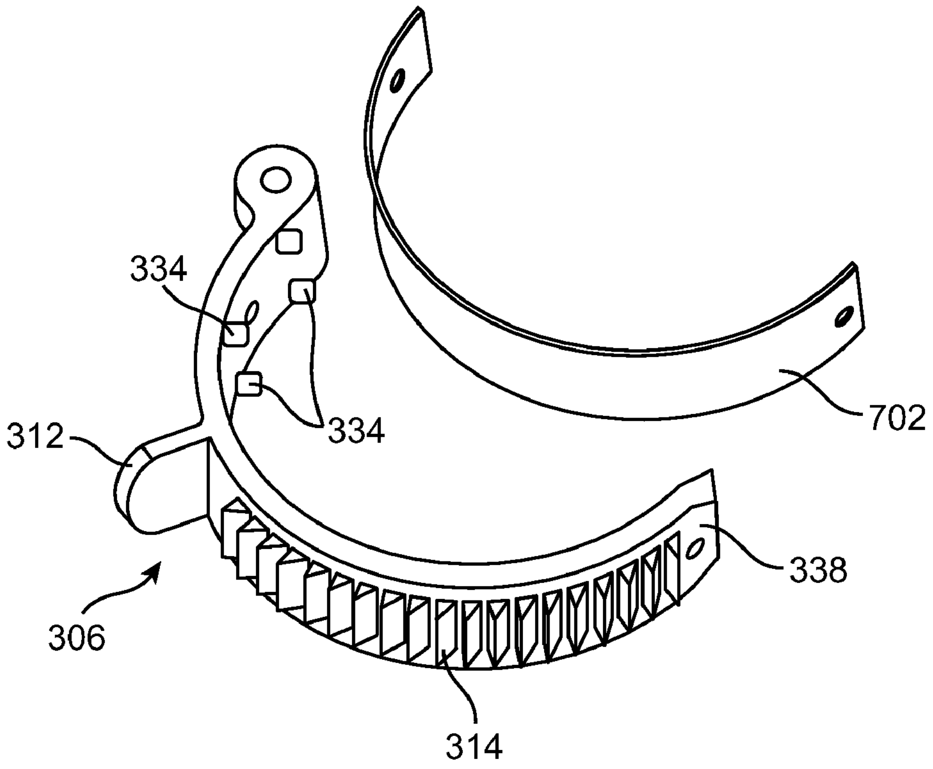
FIG. 7A is an exemplary illustration of a reinforcement insert in accordance with the present invention.
Figure 7B:
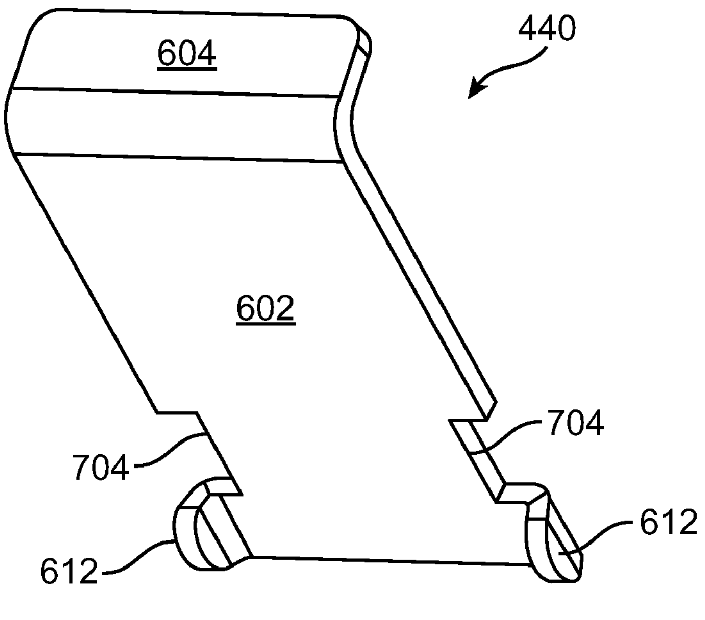
FIG. 7B is an exemplary illustration of an interlock element in accordance with the present invention.

As illustrated in FIG. 3C, the final portion (or in the illustrated embodiment, the third portion 306) disengages with the first portion 302 to allow the EAS tag 100 to be coupled with an article. As mentioned above, the third portion 306 is made of a flexible, yet durable and strong material, for example plastic, Teflon®, or hardened rubber. The third portion 306 also may have a reinforcement piece 702 (FIG. 7A) that is inserted along a length of the third portion 306. Inserted reinforcement piece 702 may be an elongated metal or wire mesh that adds strength to third portion 306 and makes it more difficult to defeat by cutting. The final or third portion 306 further includes a free leading end 338, with the final portion having a first surface that includes an engaging element 314. As best illustrated in FIGS. 3C and 3D, the leading edge 338 of the final portion 306 is inserted into an interlock opening 332 of the first portion 302, thereby enclosing the EAS tag 100 onto itself in a compact form. As best illustrated in FIG. 3D, a flange that extends from the first section 366 of the first portion 302 forms a lip 316 that facilitates quick insertion of the leading edge 338 of the final portion 306 for easily coupling the final portion 306 with the first portion 302. Accordingly, the alignment of the final portion 306 with the first portion for connection is no longer required.

As further illustrated in FIGS. 3A to 3D, the final portion 306 also includes a tab 312 that is projected from the first surface of the final portion 306, oriented transverse a longitudinal axis of the final portion 306. The tab 312 may be used to further insert the final portion 306 deeper into the first portion 302 along a reciprocating path 360 for a tighter grip of the EAS tag 100 onto the article. As more of the final portion 306 is inserted into the first portion 302 via the interlock opening 332, the size of a cavity 308 decreases until an article to be monitored is tightly maintained therein. It should be noted that the first portion 302 houses a locking mechanism (detailed below), which engages the engaging element 314 such that the insertion of the final portion 306 into the first portion 302 in the direction 360 is allowed at any desired adjustments along the longitudinal axis of the final portion 306, but extraction thereof is not allowed (unless by an authorized unlocking device). Therefore, by providing the engaging element 314, the EAS tag 100 may engage objects of varying size by making the encircled opening 308 of EAS tag 100 adjustable in accordance with the locking location or position of the final portion 306 along its length in relation to the first portion 302.

Figure 4A:
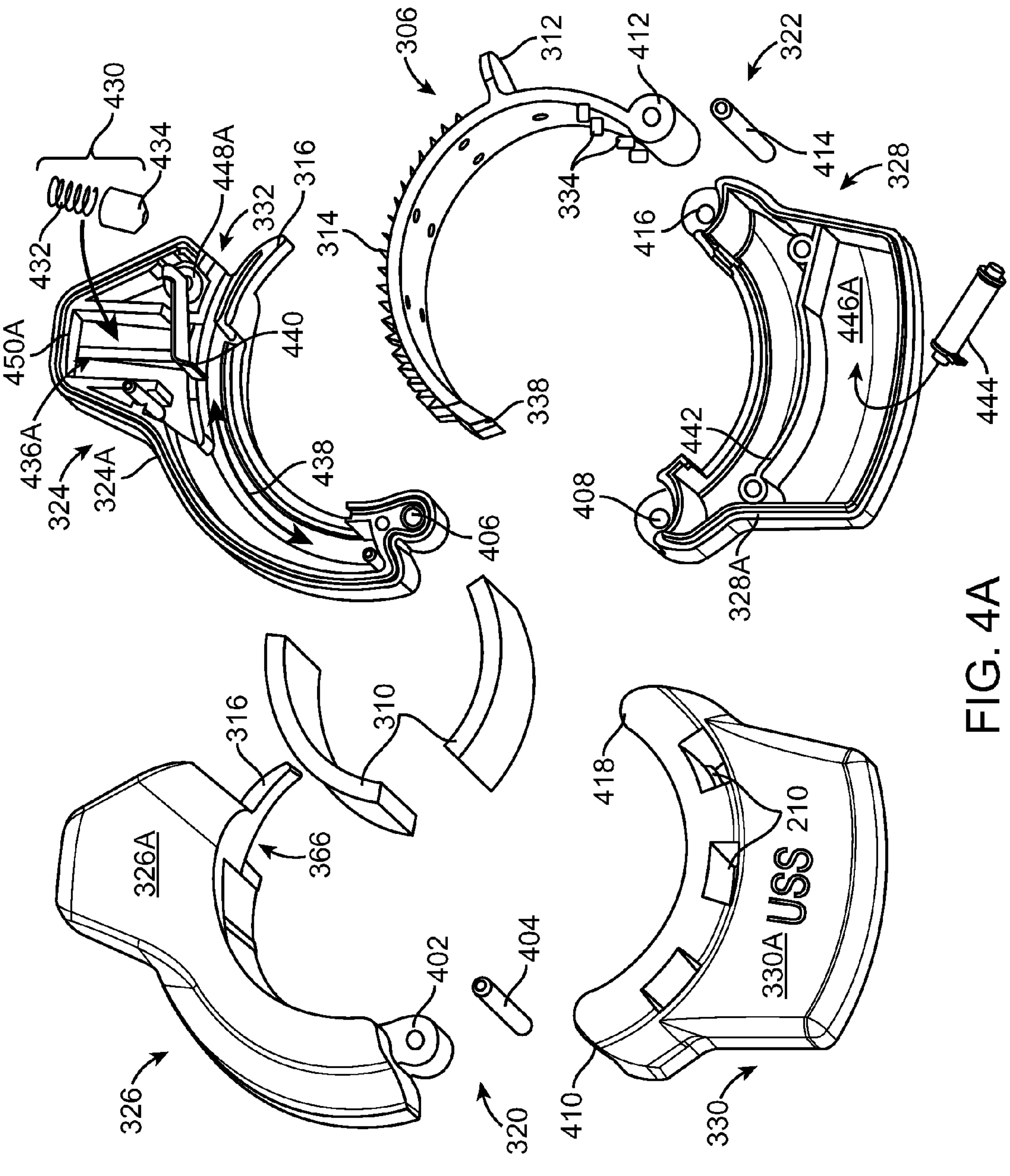
FIGS. 4A and 4B are exemplary illustrations of the disassembled EAS tag taken from the same view that is illustrated in FIG. 3A.
Figure 4B:
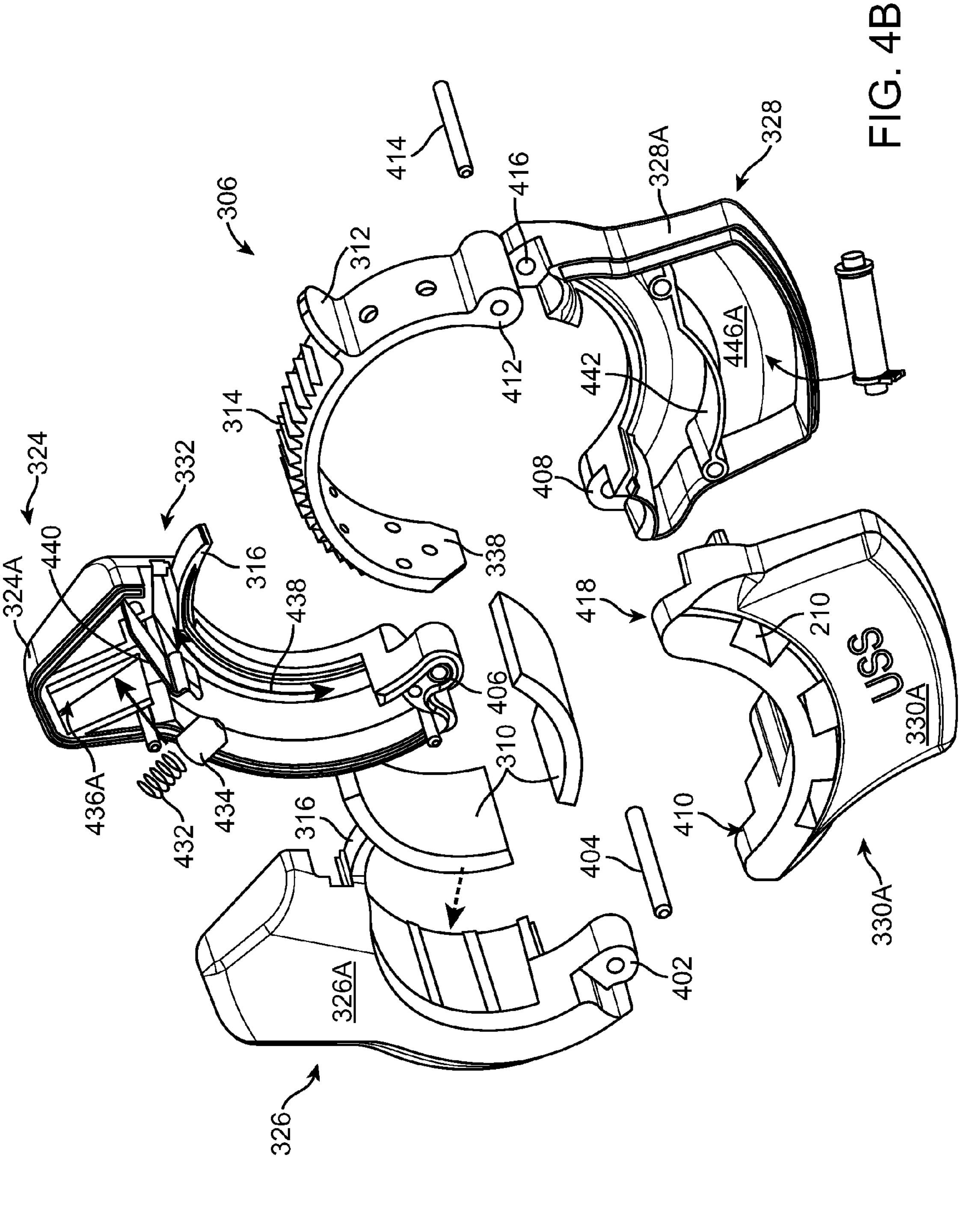
Figure 5A:
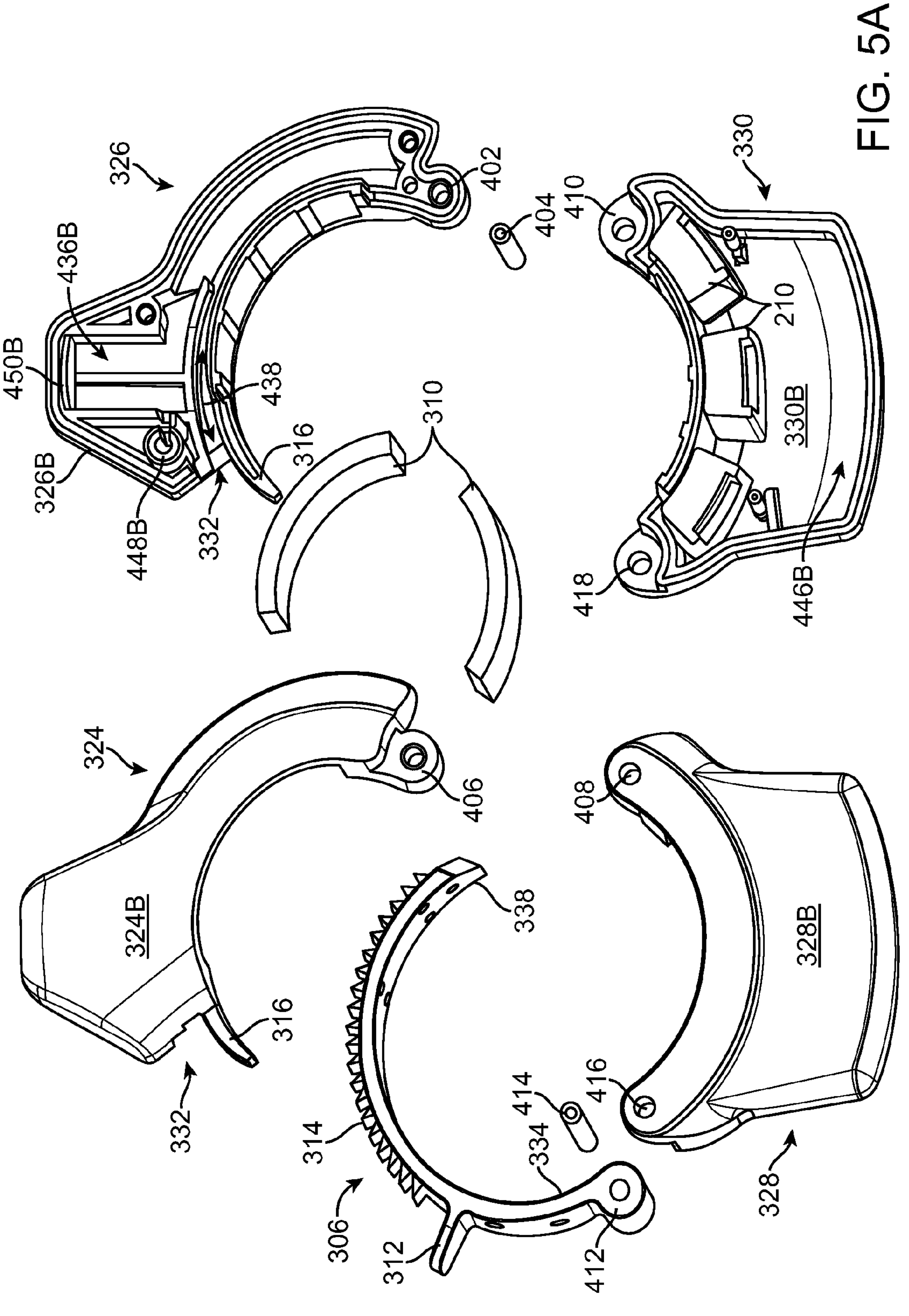
FIGS. 5A and 5B are exemplary illustrations of the disassembled EAS tag taken from the same view that is illustrated in FIG. 3B.
Figure 5B:
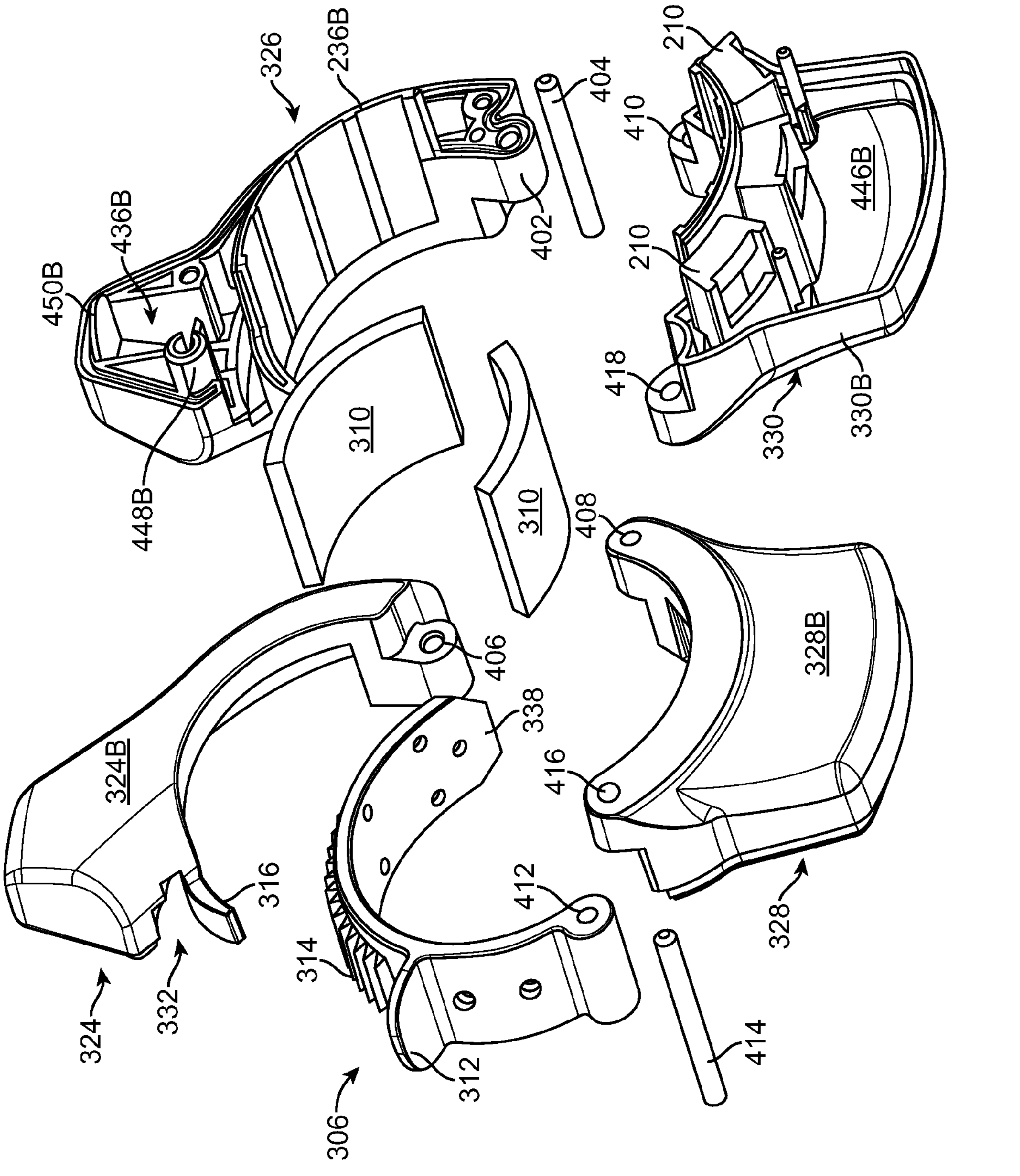
Figure 6A:
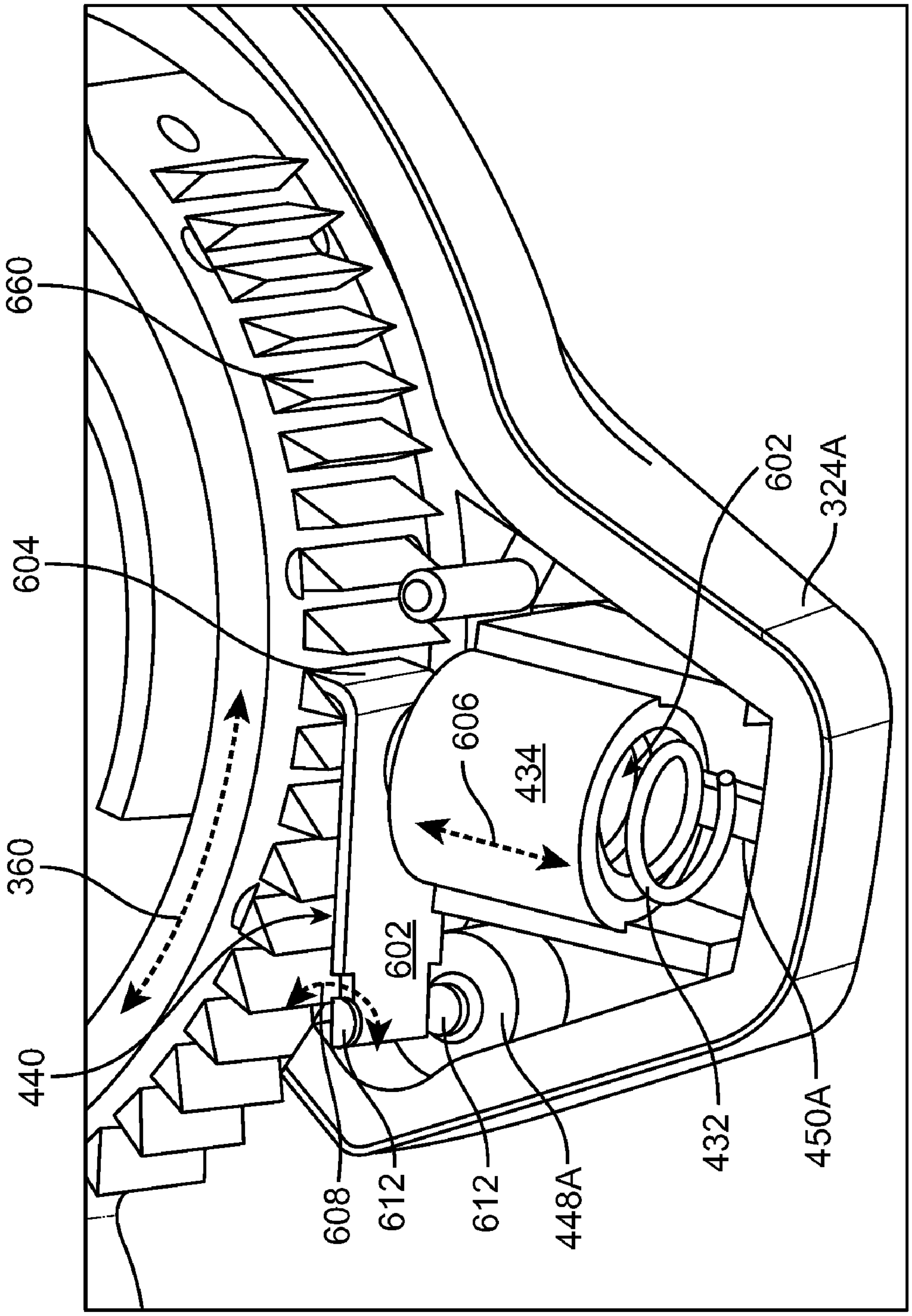
FIGS. 6A to 6C are exemplary illustrations of a lock mechanism in accordance with the present invention.
Figure 6B:
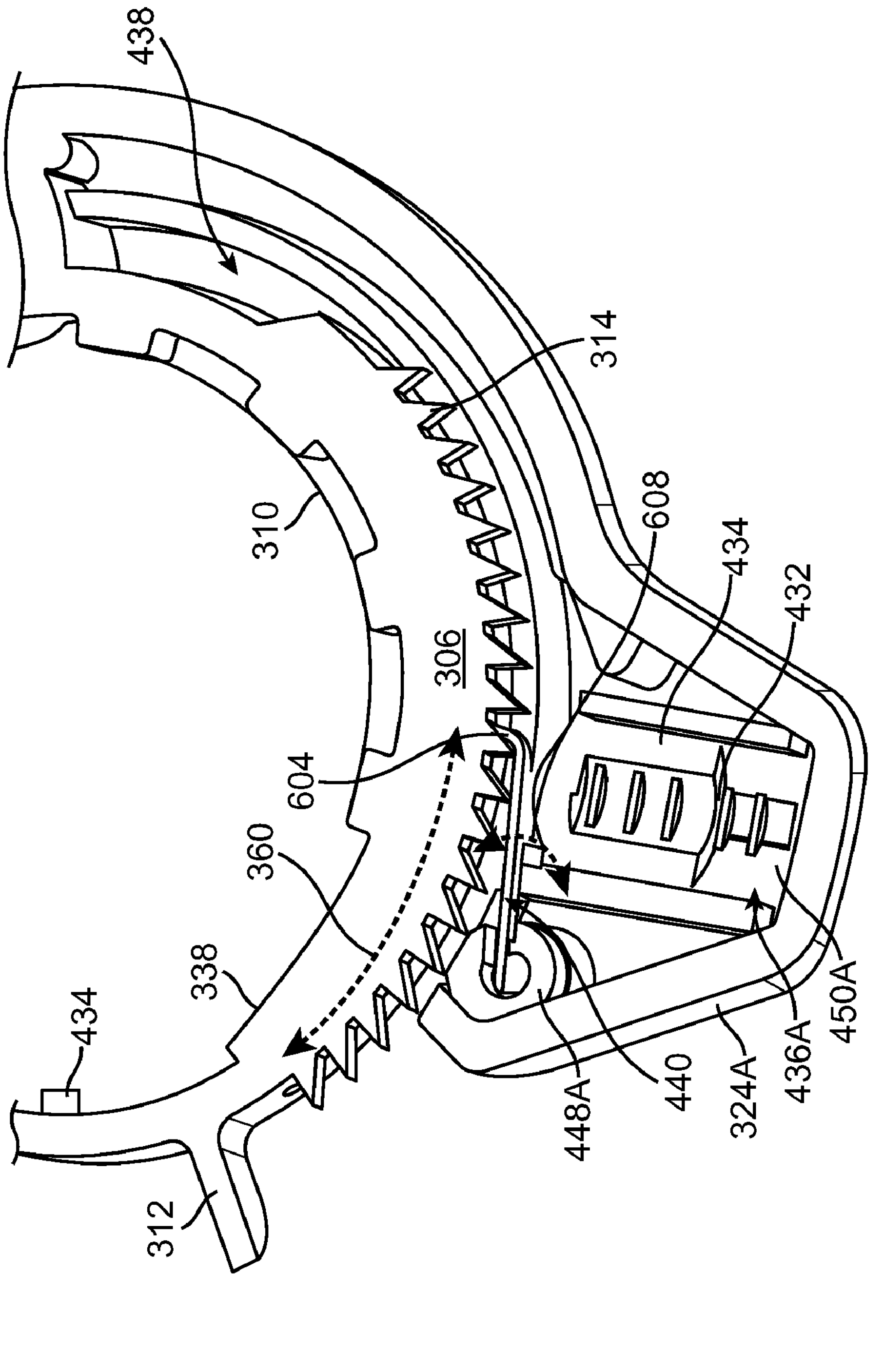
Figure 6C:
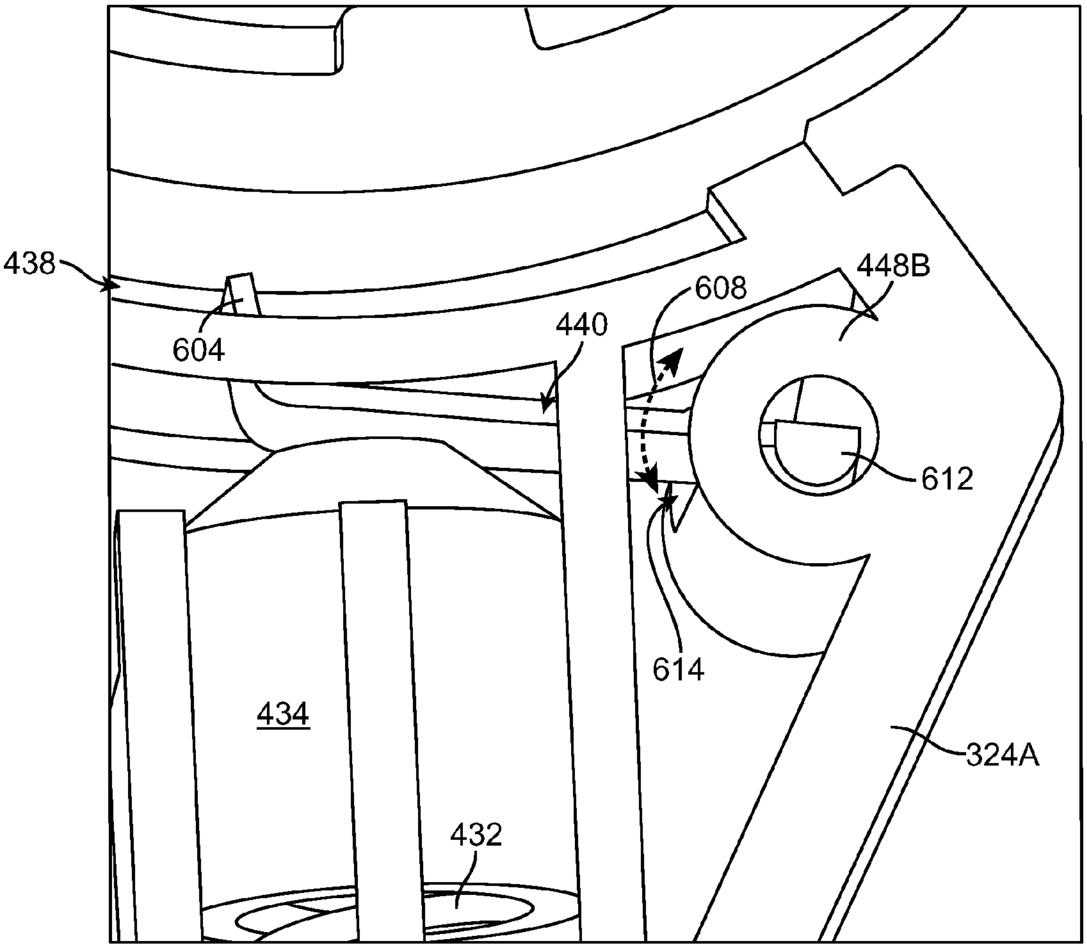

FIGS. 4A to 5B are exemplary illustrations of the disassembled EAS tag illustrated in FIGS. 1A to 3D in accordance with the present invention. FIGS. 4A and 4B are exemplary illustrations of the disassembled EAS tag taken from the same view illustrated in FIG. 3A, and FIGS. 5A and 5B are exemplary illustrations of the disassembled EAS tag taken from the same view illustrated in FIG. 3B. For the sake of brevity, clarity, convenience, and to avoid duplication, the general description of FIGS. 4A to 5B will not repeat every corresponding or equivalent component and or interconnections that has already been described above in relation FIGS. 1A to 3D.

As illustrated in FIGS. 4A to 5B, the respective first and the second portions 302 and 304 are each comprised of two pieces. The first portion 302 is comprised of the first top piece 326 connected to the first bottom piece 324. As illustrated, the first top piece 326 has a first exterior surface 326A illustrated in FIGS. 4A and 4B (top left side), and a first interior surface 326B illustrated in FIGS. 5A and 5B (top right side). The first bottom piece 324 has a first interior surface 324A illustrated in FIGS. 4A and 4B (top right side), and a first exterior surface 324B illustrated in FIGS. 5A and 5B (top left side).

As further illustrated, the second portion 304 is also comprised of the second top piece 330 connected to the second bottom piece 328. The second top piece 330 has a first exterior surface 330A illustrated in FIGS. 4A and 4B (bottom left side), and a second interior surface 330B illustrated in FIGS. 5A and 5B (bottom right side). The second bottom piece 328 has a second interior surface 328A illustrated in FIGS. 4A and 4B (bottom right side), and a second exterior surface 328B illustrated in FIGS. 5A and 5B (bottom left side).

As illustrated in FIGS. 1A to 3D, the respective first and second portions 302 and 304 are pivotally connected by the first hinge mechanism 320. As illustrated in FIGS. 4A to 5B, the first top piece 326 includes a section of the lip 316 at one end, and a first section 402 of a first hinge barrel 370 (FIG. 3B) of the first hinge mechanism 320. The second section 406 of the first hinge barrel 370 is integrally included with the first bottom piece 324. The first hinge mechanism 320 is further comprised of integrally circular, hollow sections 408 and 410 that form the knuckles of the first hinge mechanism 320, with knuckle 408 integral with a distal end of second bottom piece 328, and knuckle 410 integral with a distal end of the second top piece 330. The first hinge barrel 370 (comprised of the sections 402 and 406) is aligned in between the knuckles 408 and 410, through which a first pin 404 is inserted to couple the knuckles 408 and 410 with the first hinge barrel 370 to form the first hinge mechanism 320. The first pin 404 is inserted through the aperture of the knuckle 408 (at the exterior side 328B), the through-hole of the first hinge barrel 370, and into the closed end knuckle 410 on the second top piece 330.

As also illustrated in FIGS. 1A to 3D, the respective second and final portions 304 and 306 are also pivotally connected by a second hinge mechanism 322. As illustrated in FIGS. 4A to 5B, the second hinge mechanism 322 is comprised of integrally circular, hollow sections 418 and 416 that form the knuckles of the second hinge mechanism 322, with knuckle 416 integral with a distal end of second bottom piece 328, and knuckle 418 integral with a distal end of the second top piece 330. The second hinge mechanism 322 is further comprised of a second hinge barrel 412 at a distal end of the final or third portion 306, which may be aligned in between the knuckles 418 and 416, through which a second pin 414 is inserted to couple the knuckles 418 and 416 with the second hinge barrel 412 to form the second hinge mechanism 322. The second pin 414 is inserted through the aperture of the knuckle 416 (at the exterior side 328B), the through-hole of the second hinge barrel 412, and into the closed end knuckle 418 on the second top piece 330.

As further illustrated in FIGS. 4A to 5B, the first portion 302 is comprised of the first top piece 326 coupled with the first bottom piece 324, which forms one or more inner compartments or chambers. That is, the interior surface 326B of the first top piece 326 and the interior surface 324A of the first bottom piece 324 are comprised of various protrusions, cavities, through-holes, inner walls, and enclaves that when brought together form one or more compartments or chambers. In particular, a first compartment or chamber 436A and 436B is used to house various members of a lock mechanism (e.g., resilient member 430 and interlock element 440), and includes a back wall 450A/B, against which the resilient member 430 is pushed and supported.

As further illustrated, a second compartment or chamber 438 within the first portion 302 is used to accommodate the third portion 306. That is, the second chamber 438 can variably accommodate and lock a desired length of the final portion 306, with the first portion 302 further including the first chamber 436A/B that accommodates the lock mechanism that locks-in or interlocks with the desired length of the final portion 306 within the second chamber 438.

As is illustrated throughout the figures, the third portion 306 is comprised a free leading end 338 that is inserted into the first portion 302, with the final portion 306 having a first surface that includes an engaging element 314, with a reinforcement piece 702 (FIG. 7A) that is inserted along a length of the final portion 306. In one preferred embodiment, the engaging element 314 is comprised of a plurality of beveled teeth aligned along a length of the final portion 306 and positioned on the first surface thereof. Alternatively, the engaging element may include openings into which a locking probe may be received. The final portion 306 also has a second surface that includes a set of protuberances 334 at a near distal end thereof, which may be used as stops when the lip 316 contacts the protuberances 334 to prevent the final portion 306 to move too deep into the second chamber 438.

As further illustrated in FIGS. 4A to 5B, the second portion 304 is comprised of the second top piece 330 coupled with the second bottom piece 328, which also form one or more inner compartments or chambers. That is, the interior surface 330B of the second top piece 330 and the interior surface 328A of the second bottom piece 328 are comprised of various protrusions, cavities, through-holes, inner walls, and enclaves that when brought together form one or more compartments or chambers. In particular, a resulting third compartment or chamber 446A-446B is used to house various members of a detachable marker 444 (e.g., a signal disrupter such as a ferrite coil or other electrical or electronic components). Marker 444 may be an electronic article surveillance or RFID marker, which markers are not the subject of the instant invention and are widely known. Marker 444 functions with electronic article surveillance systems that are well known in the art to prevent theft and similar unauthorized removal of articles from a controlled area. The present invention further provides a wall 442 within the chamber 446B for added protection for the marker 44 against tampering. That is, although the slots 210 on the second top piece 330 are not open or through-holes (as illustrated in FIGS. 5A and 5B, the second interior surface 330B), the slots may be punctured after forcible removal of the blocking unit 104. The wall 442 is provided as a blocker against a tool used to tamper with the marker 444, which may be done after the forcible removal of the blocking unit 104 and possible puncture of the slots 210 to access the chamber 446B.

FIGS. 6A to 6C, and 7B are exemplary illustrations of the details of a lock mechanism of the EAS tag 100 in accordance with the present invention. As illustrated in FIGS. 6A to 6C, and 7B, the lock mechanism housed in the first chamber 436A/B of the first portion 302 includes a resilient member 430 that forces an interlock element 440 towards the final portion 306 inserted within the second chamber 438 to lock a desired length of the final portion 306 within the second chamber 438. The resilient member 430 includes a biasing mechanism 432 and an intermediary element 434 that forces the interlock element 440 towards a section of the final portion 306 as the final section 306 is pushed inside the second chamber 438 along the path 360.

The interlock element 440 has an arm 602 that is pivotally housed in a cylindrical chamber 448A/B. The interlock element 440 includes a set of distal lateral flanges 612 that are inside the cylindrical chamber 448A/B, pivotally securing the interlock element 440. As further illustrated, the interlock element 440 also includes a set of lateral indentations 704 that allow the interlock element 440 to pivot within the cylindrical chamber 448A/B along the reciprocating path 608, limited by the dimensions of the side walls of cylinder pivot hole 614. Accordingly, as the final portion 306 is inserted into the first portion 302 via the interlock opening 332, an engaging tip 604 of the interlock element 440 contacts the engaging elements 314 and pivots along path 608 to enable insertion, but not extraction of the final portion 306 from the first portion 302. That is, the engaging tip 604 is pushed by the resilient member 430 in the direction indicated by the reciprocating path 606 into the path 360 of the final portion 306, whereby the engaging tip 604 move along path 608 and attaches to engaging element 314 such that insertion into first portion 302 is allowed, but extraction is not.

It should be noted that the interlock element 440 and the resilient member 430 are independent components. Therefore, the interlock element 440 will remain interlocked and engaged with the final portion 306 even when the force or push exerted by the resilient member 430 is suddenly removed. That is, application of a quick sharp force to disengage the resilient member 430, and force it to move away from the interlock element 440 along path 606 will not disengage the interlock element 440 from final portion 306. In other words, if a user literally knocks or hits the EAS tag 100 against a hard surface, the force from the hit may move the resilient member 430 along path 606 towards wall 450A/B and away from the interlock element 440 within the device, but the interlock element 440 will continue to "hold onto" and remain interlocked and engaged with the engaging teeth 314.

To properly release and disengage the interlock member 440 from the final portion 306, the force exerted by the resilient member 430 must first be reversed, and the final portion 306 itself further pushed slightly into the second chamber 438 by the tab 312 along the path 360. The exerted force by the resilient member 430 may be reversed by a magnetic release mechanism, which will magnetically pull-in the resilient member 430 away from the interlock member 440 along path 606, compressing the biasing mechanism 432. The magnetic pull will also pull the interlock member 440 along pivot path 608 to release and disengage the interlock member 440 from the final portion 306. The further push of the final portion 306 along path 360 forces the tip 604 of the interlock member 440 to slide over the beveled side 660 of the teeth engaging member 314, and "fall" away from the engaging member 314 and pulled towards the resilient member 430 (which is magnetically pulled by the magnetic release mechanism). The resilient member 430 (the biasing mechanism 432 and the intermediary element 434) and the interlock member 440 are all made of a material that responds to magnetic forces and in a preferred non-limiting embodiment are made of metal or alloys of metals or like material. Therefore, in order to allow the removal of tag 100 from an article maintained therein, a magnet or a magnetic release mechanism having a predetermined amount of magnetic force for overcoming the force applied by resilient member 430 is applied to the exterior of the wall 450A/B of the first portion 302. When the predetermined amount of magnetic force is applied, intermediary element 434 is forced to move towards wall 450A/B while compressing biasing mechanism 432. Upon removal of the magnetic force, resilient member 430 recoils and forces intermediary element 434 to its attaching state to once again receive engaging element 314.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. A theft deterrent tag, comprising:

an adjustable housing comprised of a plurality of portions movably coupled with one another, forming an adjustable enclosure;

a marker;

wherein: a portion of the plurality of portions is movably coupled with a next, subsequent adjacent portion of the plurality of portions, a first section of a first portion of the plurality of portions detachably, and adjustably accommodating a final portion of the plurality of portions to form the adjustable enclosure;

wherein: the first portion includes an opening defined through the first section that receives a free leading end of the final portion, and further includes a second chamber that can variably accommodate and lock a desired length of the final portion; the first portion further includes a first chamber that accommodates a lock mechanism that locks in the desired length of the final portion within the second chamber;

wherein: the lock mechanism includes: a resilient member that forces an interlock element towards the final portion inserted within the second chamber to lock a desired length of the final portion within the second chamber;

a two-step disengagement arrangement, wherein:

the interlock element remains interlocked and engaged with the final portion when the force exerted by the resilient member is removed; and the interlock element is released and disengages from the final portion when the force exerted by the resilient member is reversed and the final portion is further pushed into the second chamber to release and disengage the interlock member while the reversed force pulls the interlock member away from the final portion.

2. The theft deterrent tag as set forth in claim 1, wherein: the final portion is comprised of:

a free leading end, with the final portion having a first surface that includes an engaging element; and a reinforcement piece that is inserted along a length of the final portion.

3. The theft deterrent tag as set forth in claim 2, wherein: the engaging element is comprised of a plurality of beveled teeth aligned along a length of the final portion, and positioned on the first surface.

4. The theft deterrent tag as set forth in claim 2, wherein: the engaging element includes openings into which a locking probe is received.

5. The theft deterrent tag as set forth in claim 2, further including:

a release tab is projected from the first surface of the final portion, oriented transverse a longitudinal axis of the final portion.

6. The theft deterrent tag as set forth in claim 2, wherein: the final portion has a second surface that includes a set of protuberances at a near distal end.

7. The theft deterrent tag as set forth in claim 1, wherein: a flange extends from the first section of the first portion forming a lip that facilitates coupling of the final portion with the first portion.

8. The theft deterrent tag as set forth in claim 1, wherein: the resilient member includes a biasing mechanism and an intermediary element that forces the interlock element towards a section of the final portion in the second chamber.

9. The theft deterrent tag as set forth in claim 8, wherein: the interlock element is an arm with an engaging tip that is pushed into the path by the intermediary element, whereby the engaging tip attaches to an engaging element, such that insertion into the first portion is allowed, but extraction is not.

10. The theft deterrent tag as set forth in claim 1, wherein: a portion of the plurality of portions accommodates the marker in a form of a signal disrupter and the marker is detachable.

11. The theft deterrent tag as set forth in claim 1, wherein: a portion of the plurality of portions is a fastener.

12. The theft deterrent tag as set forth in claim 1, wherein: the plurality of portions have an arced configuration.

13. The theft deterrent tag as set forth in claim 1, further including:

a friction pad coupled with the adjustable housing for preventing a movement of the theft deterrent tag in relation to an associated article.

14. The theft deterrent tag as set forth in claim 13, wherein: the friction pad is comprised of a plurality of friction pads individually coupled with the adjustable housing.

* * * * *